United States Patent
Takashima

(10) Patent No.: US 9,167,031 B2
(45) Date of Patent: Oct. 20, 2015

(54) DISTRIBUTED PROCESSING SYSTEM AND DISTRIBUTED PROCESSING METHOD

(75) Inventor: Masanori Takashima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 13/137,251

(22) Filed: Aug. 1, 2011

(65) Prior Publication Data

US 2011/0289235 A1    Nov. 24, 2011

(51) Int. Cl.
*G06F 15/173* (2006.01)
*H04L 29/08* (2006.01)
*G06F 9/46* (2006.01)

(52) U.S. Cl.
CPC ........ *H04L 67/1002* (2013.01); *H04L 67/2857* (2013.01)

(58) Field of Classification Search
USPC .......................................... 709/241
See application file for complete search history.

(56) References Cited

U.S. PATENT DOCUMENTS

| | | | |
|---|---|---|---|
| 7,284,051 B1 | 10/2007 | Okano et al. | |
| 2003/0028515 A1* | 2/2003 | Nishikado et al. | 707/1 |
| 2004/0268357 A1* | 12/2004 | Joy et al. | 718/105 |
| 2006/0031536 A1 | 2/2006 | Eydelman et al. | |

FOREIGN PATENT DOCUMENTS

| | | |
|---|---|---|
| JP | 2000-196677 A | 7/2000 |
| JP | 2005-344504 A | 11/2002 |
| JP | 2005-5926 A | 1/2005 |
| JP | 2005-228036 A | 8/2005 |
| JP | 2005-339550 A | 12/2005 |
| WO | WO 2004/093394 A1 | 10/2004 |

OTHER PUBLICATIONS

Japanese Notification of Reasons for Refusal with partial English-Translation/Explanation of the Relevance dated Sep. 16, 2014.
Hiroshi Kubota, "New face Research & Development", Nikkei Network No. 104, Nikkei BP Inc., dated Nov. 28, 2008, pp. 80-81.

* cited by examiner

*Primary Examiner* — Chris Parry
*Assistant Examiner* — Alan S Chou
(74) *Attorney, Agent, or Firm* — McGinn IP Law Group, PLLC.

(57) ABSTRACT

A distributed processing system 100 includes: a plurality of application servers 1031 to 103n that execute a plurality of applications 1321 to 132n and detect a communication state between a client 105 and the applications 1321 to 132n; a load distribution control server 101 that decides a communication path between the client 105 and the applications 1321 to 132n on a basis of the communication state detected by the application servers 1031 to 103n to perform load distribution; and an intermediate communication apparatus 102 that transfers flow data between the client 105 and the application servers 1031 to 103n.

18 Claims, 8 Drawing Sheets

FIG. 3

(FLOW STATE DB)

| SESSION IDENTIFICATION INFORMATION | COMMUNICATION PATH INFORMATION |
|---|---|
| FLOW INFORMATION<br>EX.) IP 5 tuples = IP erc. IP det. Protocol. Port erc. Port det. | COMMUNICATION PATH INFORMATION FOR SYSTEM<br>EX.) INPUT PORT INFORMATION → SW1(FLOW DB IDENTIFICATION NUMBER) → OUTPUT Port NUMBER → MAC ADDRESS → APPLICATION NUMBER |

FIG. 4

(APPLICATION COMMUNICATION STATE DB)

| APPLICATION IDENTIFICATION INFORMATION | APPLICATION SERVER IDENTIFICATION INFORMATION | COMMUNICATION STATE INFORMATION | INFORMATION EFFECTIVENESS |
|---|---|---|---|
| APPLICATION NUMBER | EX.) MAC ADDRESS | EX.) DURING ESTABLISHING A SESSION, DURING NORMAL COMMUNICATION, DURING SESSION ENDING | EX.) UPDATE TIME |

FIG. 5

(FLOW TRANSFER DB)

| SESSION IDENTIFICATION INFORMATION | TRANSFER DESTINATION INFORMATION | COMMUNICATION STATE INFORMATION |
|---|---|---|
| FLOW INFORMATION EX.) IP 5 tuples = IP erc. IP det. Protocol. Port erc. Port det. | APPLICATION SERVER NUMBER EX.) MAC ADDRESS | EX.) COMMUNICATION PERFORMED, NO COMMUNICATION |

FIG. 6

(COMMUNICATION STATE DB)

| APPLICATION IDENTIFICATION INFORMATION | SESSION IDENTIFICATION INFORMATION | COMMUNICATION STATE INFORMATION |
|---|---|---|
| APPLICATION NUMBER | FLOW INFORMATION<br>EX.) IP 5 tuples = IP erc. IP det. Protocol. Port erc. Port det. | EX.) DURING ESTABLISHING A SESSION, DURING NORMAL COMMUNICATION, DURING SESSION ENDING |

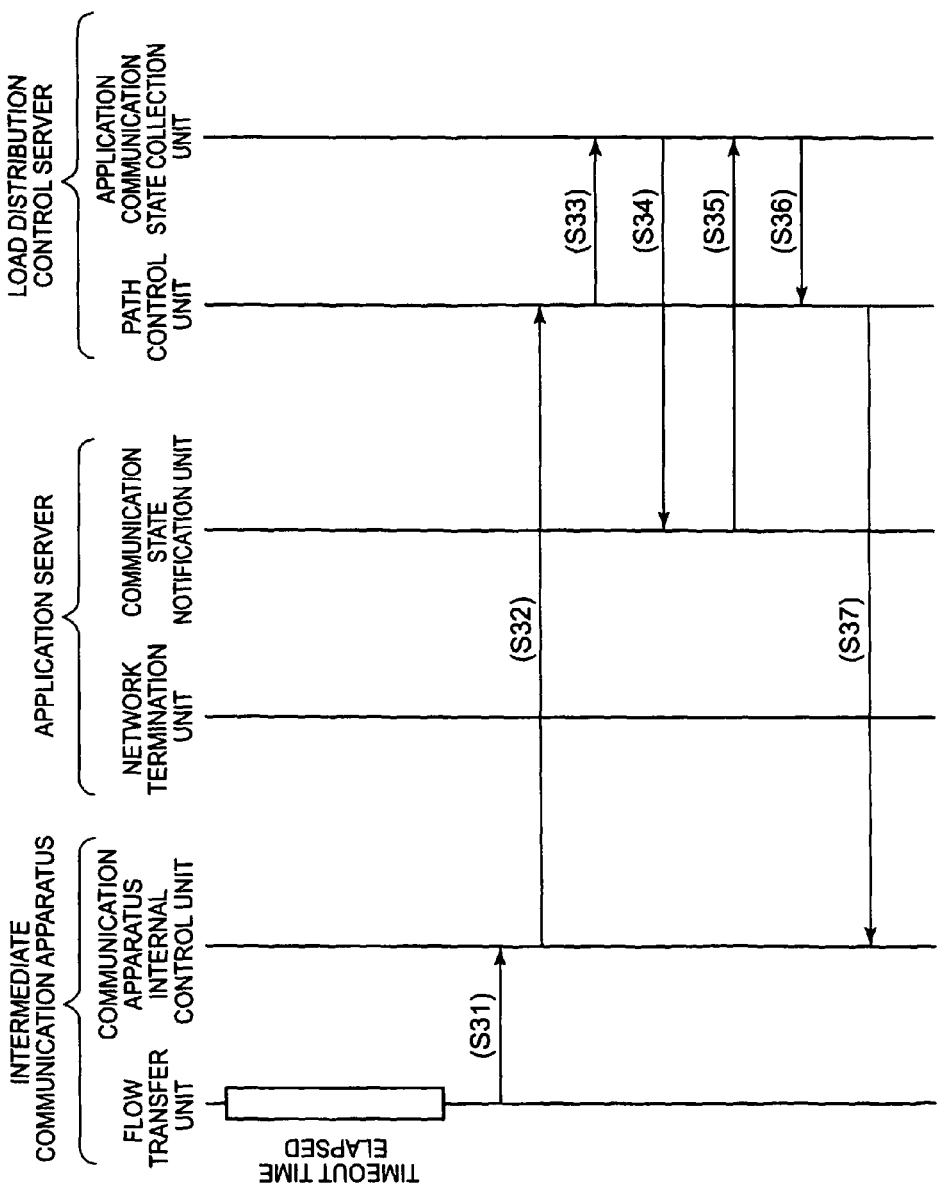

DISTRIBUTED PROCESSING SYSTEM AND DISTRIBUTED PROCESSING METHOD

The present application is based on International Application No. PCT/JP2010/001813, filed on Mar. 15, 2010, which is based on the Japanese Patent Application No. 2009-064338, filed on Mar. 17, 2009, the entire contents of which are incorporated herein by reference.

TECHNICAL FIELD

The present invention relates to a distributed processing system and a distributed processing method to distribute a load of a system, and particularly relates to a distributed processing system and a distributed processing method capable of reducing a load on an application server while keeping reliability of the system.

BACKGROUND ART

With the development of the Internet in recent years, a usage pattern of connecting to a plurality of application servers located in a data center, a company network or the like from a client in a remote place to use applications in the application servers continues to increase. With an increase of such a usage pattern, a load on an application server executing applications has increased year by year. To cope with this, a general available method is to arrange a plurality of application servers for load distribution while improving the scalability thereof. In order to improve the scalability of application servers, there arises a need to perform load distribution of the communications between the client and the applications among a plurality of application servers by using an intermediate communication apparatus.

Meanwhile, a data relay apparatus is known, which collects load information on a server as well as on a path from the data relay apparatus to the server and selects a path between a client and the server on the basis of this load information (e.g., see PTL 1).

CITATION LIST

Patent Literature

PTL 1: WO 04/093394

SUMMARY OF INVENTION

Technical Problem

As stated above, when a client is connected with a plurality of application servers in a distributed manner, a communication state between the client and the application servers is monitored for each communication. In this case, an intermediate communication apparatus monitors a passing packet and estimates a session state on the basis of communication state information such as a flag in the packet to find a communication state between the client and the application servers. When the passing packet is monitored in this way, there is a need to check payload and a communication state flag for every passing packet, thus requiring very complicated processing and leading to the possibility of an increase in cost for the intermediate communication apparatus.

On the other hand, when a communication path is configured between a client and application servers without monitoring nor managing a communication state, for example, since the communication does not exist in the initial state, the starting of the communication can be detected. However, it becomes difficult to detect a change in communication state such as the end of the communication. In order to detect the communication end, a communication state flag in a packet may be monitored, or a timer may be used to detect the stop of communication traffic, for example.

For instance, when timeout of a timer is used for the detection of communication end with consideration given to cost reduction, it becomes difficult to determine whether the cause for the stop of communication traffic is due to the communication end or due to just the stop of application use by a client. Alternatively, in spite of temporary disruption of communication, it might be misunderstood as communication end, and after the elapse of a certain period of time the communication may be resumed. In this case, upon resumption of the communication, the client may fail to connect with an appropriate application server to resume the use of applications, thus causing the possibility of reliability degradation in the system. In the data relay apparatus disclosed in the aforementioned PTL 1, a load on a server can be distributed and reduced on the basis of the collected load information, for example. However, PTL 1 does not disclose that reliability of the system is maintained after server load reduction, for example.

In order to cope with these problems, it is a major object of the present invention to provide a distributed processing system and a distributed processing method capable of reducing a load on an application server while keeping reliability of the system.

Solution to Problem

In order to fulfill the above-stated object, in one aspect of the present invention, a distributed processing system includes: a plurality of application servers that execute a plurality of applications and detect a communication state between a client and the applications; a load distribution control server that decides a communication path between the client and the applications on a basis of the communication state detected by the application servers to perform load distribution; and an intermediate communication apparatus that transfers flow data between the client and the application servers.

In order to fulfill the above-stated object, in another aspect of the present invention, a distributed processing method includes the steps of: executing a plurality of applications and detecting a communication state between a client and the applications; deciding a communication path between the client and the applications on a basis of the communication state detected and performing load distribution; and transferring flow data between the client and the application servers.

Advantageous Effects of Invention

According to the present invention, a distributed processing system and a distributed processing method capable of reducing a load on an application server while keeping reliability of the system can be provided.

BRIEF DESCRIPTION OF DRAWINGS

FIG. 3 illustrates session identification information and communication path information stored in a flow state DB of a load distribution control server.

FIG. 4 illustrates application identification information, application server identification information, communication state information and information effectiveness stored in an application communication state DB of a load distribution control server.

FIG. 5 illustrates session identification information, transfer destination information and communication state information stored in a flow transfer DB of an intermediate communication apparatus.

FIG. 6 illustrates application identification information, session identification information and communication state information stored in a communication state DB of an application server.

FIG. 8 illustrates an exemplary operation flow of communication ending processing between a client and applications in a distributed processing system according to one exemplary embodiment of the present invention.

DESCRIPTION OF EMBODIMENT

Figure 1:
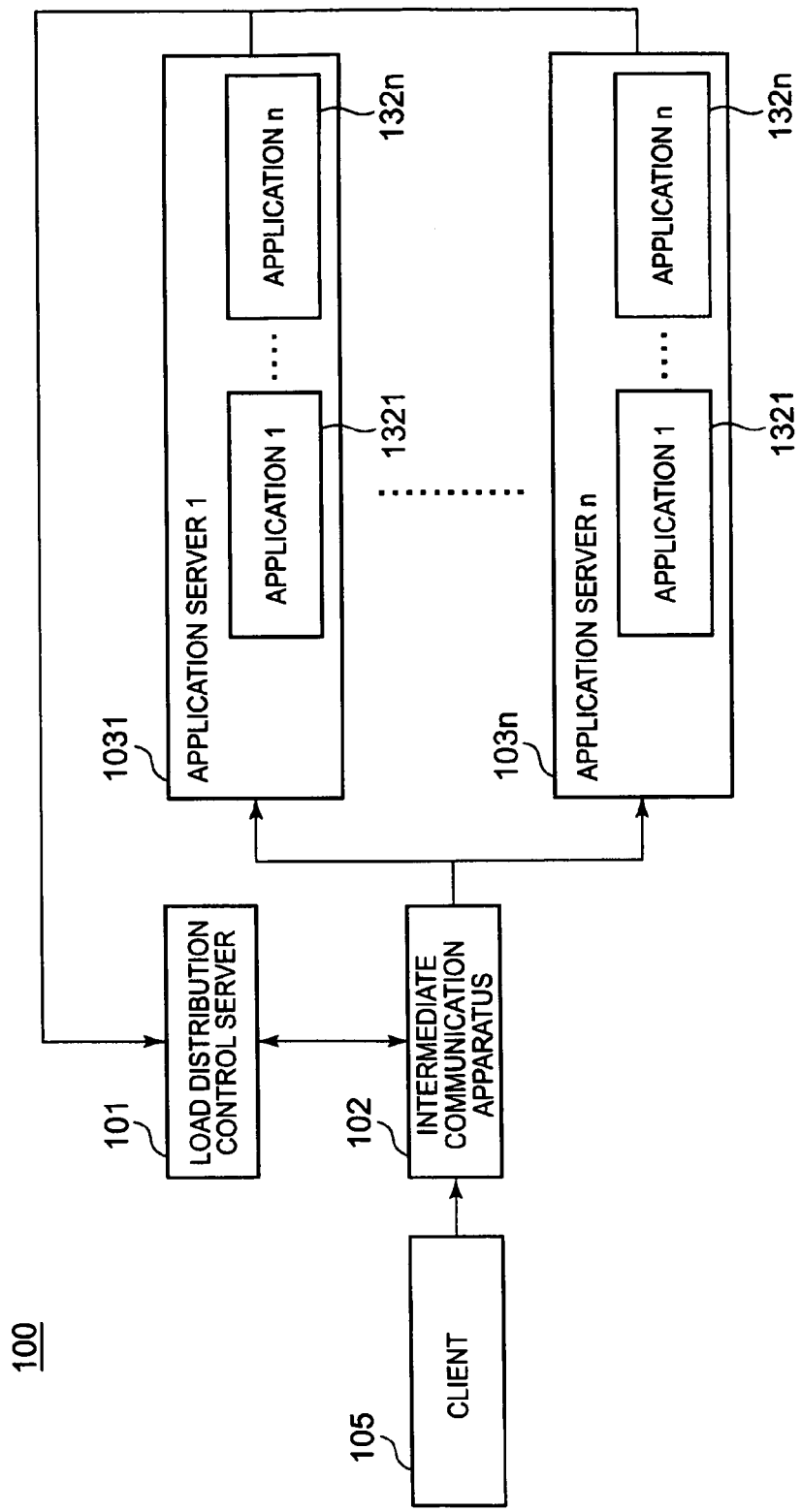
FIG. 1 is a functional block diagram of a distributed processing system according to one exemplary embodiment of the present invention.

The following describes exemplary embodiments of the present invention with reference to the drawings. FIG. 1 is a functional block diagram of a distributed processing system according to one exemplary embodiment of the present invention. A distributed processing system 100 according to the present exemplary embodiment includes a plurality of application servers 1 to n (1031 to 103n), a load distribution control server 101 and an intermediate communication apparatus 102.

Each application server 1 to n (1031 to 103n) can execute a plurality of applications 1 to n (1321 to 132n) and detect communication states between a client 105 and the applications 1 to n (1321 to 132n). The load distribution control server 101 can decide communication paths between the client 105 and the applications 1 to n (1321 to 132n) on the basis of the communication states detected by the application servers 1 to n (1031 to 103n) for load distribution. The intermediate communication apparatus 102 can transfer flow data between the client 105 and the application servers 1 to n (1031 to 103n).

The distributed processing system 100 of the present exemplary embodiment can detect the start and the timeout of communications between the client 105 and the application servers 1 to n (1031 to 103n) appropriately, and can detect communication states of the application servers 1 to n (1031 to 103n) correctly. The distributed processing system 100 further makes the intermediate communication apparatus 102 maintain and manage the consistency of the communication in the distributed processing system 100 as a whole, whereby abnormal connections or the like between the client 105 and the applications 1 to n (1321 to 132n) can be suppressed securely and reliability of the distributed processing system 100 can be maintained. The distributed processing system 100 still further divides a communication connection between a new client 105 and the applications 1 to n (1321 to 132n) among the plurality of application servers 1 to n (1031 to 103n) appropriately, thus effectively reducing a load on the application servers 1 to n (1031 to 103n).

Figure 2:
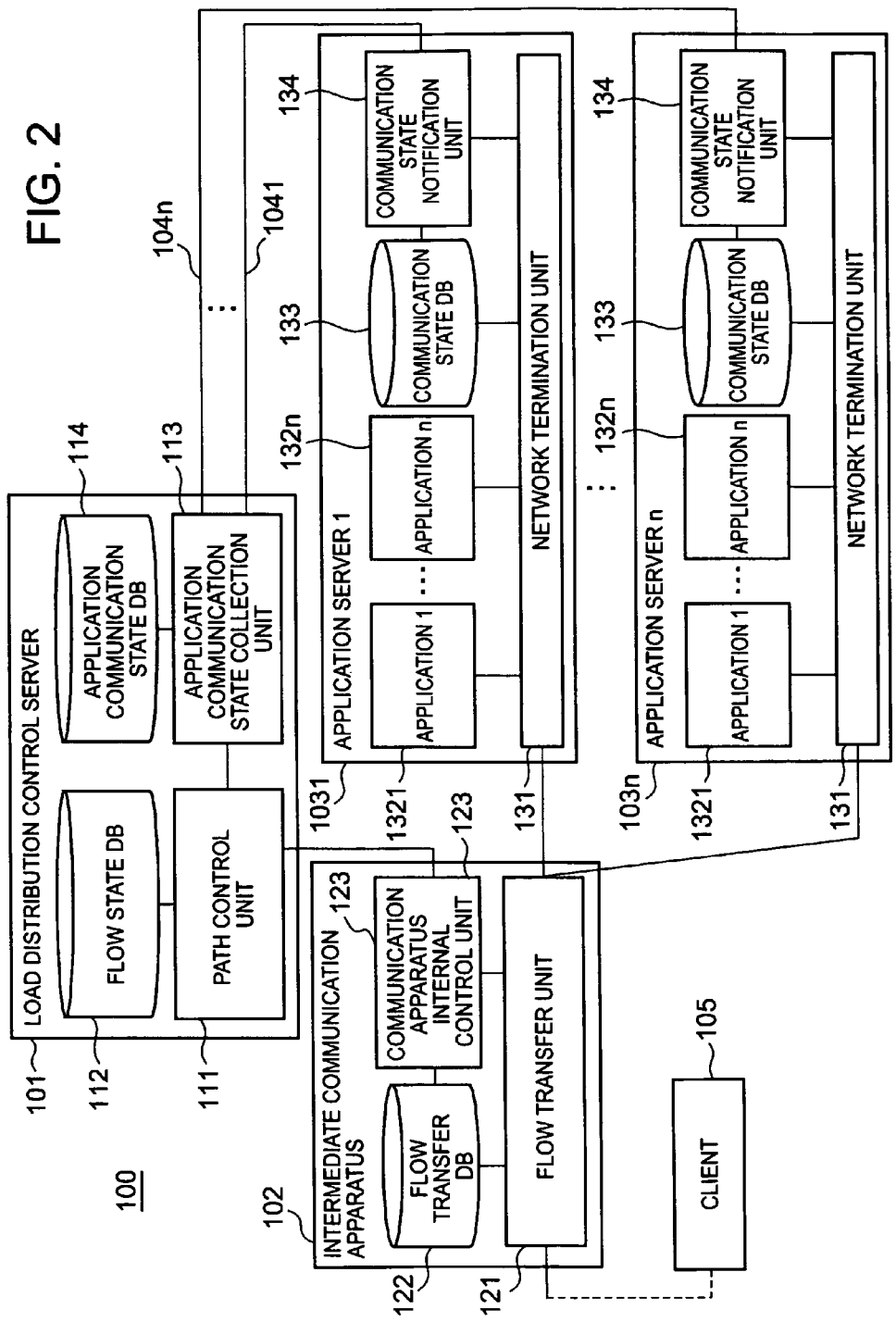
FIG. 2 is a block diagram illustrating a schematic configuration of a distributed processing system according to one exemplary embodiment of the present invention.

FIG. 2 is a block diagram illustrating a schematic configuration of a distributed processing system according to one exemplary embodiment of the present invention. In the distributed processing system 100 according to the present exemplary embodiment, a client 105 in a remote place, for example, connects with a plurality of application servers 1 to n (1031 to 103n) located in a data center, a company network or the like for communication via an intermediate communication apparatus 102 to use applications 1 to n (1321 to 132n) in the application servers 1 to n (1031 to 103n). The distributed processing system 100 includes the load distribution control server 101, the intermediate communication apparatus 102 and the plurality of application servers 1 to n (1031 to 103n).

The load distribution control server 101 decides configuration, maintenance, change, deletion or the like of the communication paths between the client 105 and the applications 1 to n (1321 to 132n) on the basis of communication states of the respective communication paths.

The intermediate communication apparatus 102 can transfer a flow (flow data) including a destination address (IP destination address) and a source address, for example, to a designated application server 1 to n (1031 to 103n) as a transfer destination in a communication between the client 105 and the applications 1 to n (1321 to 132n). The intermediate communication apparatus 102 further has a function of transmitting an initial packet to the load distribution control server 101 when a flow (a set of packets) to be transferred does not exist. The intermediate communication apparatus 102 still further has a function of, when a packet that hits a registered flow and is to be transferred does not exist, performing timeout after the elapse of a certain period of time and transmitting the timeout information to the load distribution control server 101.

The application servers 1 to n (1031 to 103n) have a function of performing termination processing for communications between the client 105 and the applications 1 to n (1321 to 132n). The application servers 1 to n (1031 to 103n) further have a function of executing the applications 1 to n (1321 to 132n) therein and monitoring communication states between the client 105 and the applications 1 to n (1321 to 132n). The load distribution control server 101 has a function of detecting communication states between the client 105 and the applications 1 to n (1321 to 132n) from the application servers 1 to n (1031 to 103n) via application communication state monitoring interfaces 1 to n (1041 to 104n).

The load distribution control server 101 includes a path control unit 111, a flow state DB (database) 112, an application communication state collection unit 113 and an application communication state DB (database) 114.

The path control unit 111 implements search for communication paths between the client 105 and the application servers 1 to n (1031 to 103n) on the basis of communication states therebetween and decides the communication paths. The path control unit 111 further implements configuration, maintenance, change, deletion or the like of a communication path of a flow, reception of an initial packet, reception of timeout information or the like with respect to the intermediate communication apparatus 102.

The flow state DB 112 stores and manages flow information or the like configured with respect to the intermediate communication apparatus 102. The flow state DB 112, for example, stores session identification information and communication path information (FIG. 3).

The session identification information contains, for example, flow information that can be specified by IP 5 tuples (such as an IP source address, a destination address, a protocol number, a source port number and a destination port number). The communication path information contains information on the intermediate communication apparatus 102 with respect to which a flow is input/output (a physical input port for inputting and a physical output port for outputting), a destination MAC address to be rewritten at that time, an application server 1 to n (1031 to 103n) for next transferring, an MAC address thereof, an application 1 to n (1321 to 132n) in the application servers 1 to n (1031 to 103n) to be received and the like.

The application communication state collection unit 113 maintains, manages and the like communication states between the client 105 and the applications 1 to n (1321 to 132n), which are acquired from the application servers 1 to n (1031 to 103n) via the application communication state monitoring interfaces 1 to n (1041 to 104n). The application communication state collection unit 113 further transmits a position, a communication state and the like of the application servers 1 to n (1031 to 103n) in response to an inquiry from the path control unit 111.

The application communication state DB 114 caches (stores) information on communication states between the client 105 and the applications 1 to n (1321 to 132n) acquired by the application communication state collection unit 113. The application communication state DB 114 further stores information for inquiries to the application servers 1 to n (1031 to 103n) and the like.

The application communication state DB 114, for example, stores application identification information, application server identification information, communication state information and information effectiveness (FIG. 4). The application identification information contains information such as application numbers and the like to identify the applications 1 to n (1321 to 132n). The application server identification information contains information such as an MAC address to specify the application servers 1 to n (1031 to 103n). The communication state information contains communication states between the client 105 and the application servers 1 to n (1031 to 103n), such as during establishing a session, during normal communication, during session ending and the like. The information effectiveness shows the effectiveness of the information, containing information such as update time.

The intermediate communication apparatus 102 includes a flow transfer unit 121, a flow transfer DB (database) 122 and a communication apparatus internal control unit 123.

The flow transfer unit 121 performs a search in the flow transfer DB 122 on the basis of key information required for flow identification extracted from a packet in a flow, and decides an application server 1 to n (1031 to 103n) as a transfer destination of the packet. Then, the flow transfer unit 121 transfers the packet to the decided application server 1 to n (1031 to 103n). The flow transfer unit 121 further implements special action information included in the packet of the flow such as rewriting of an MAC header or QoS with respect to the packet.

The flow transfer DB 122 can store a flow. The flow transfer DB 122 further stores session identification information, transfer destination information and communication state information, for example (FIG. 5). The session identification information contains flow information that can be specified by IP 5 tuples (such as an IP source address, a destination address, a protocol number, a source port number and a destination port number). The transfer destination information, for example, contains an application server number or the like that can be specified by a MAC address as a flow transfer destination. The communication state information, for example, contains information indicating the presence or not of a communication.

The communication apparatus internal control unit 123 performs a communication with the load distribution control server 101 and maintains, manages and the like the flow transfer DB 122. The communication apparatus internal control unit 123 further can acquire timeout information of a flow by checking an initial packet from the flow transfer unit 121, information of the flow transfer DB 122 and the like.

Each application server 1 to n (1031 to 103n) includes a network termination unit 131, a plurality of applications 1 to n (1321 to 132n), a communication state DB 133 and a communication state notification unit 134.

The network termination unit 131, for example, performs termination processing with respect to a communication between the client 105 and the applications 1 to n (1321 to 132n) such as TCP, UDP or the like. The applications 1 to n (1321 to 132n) may be application programs, for example, for actual implementation of a communication with the client 105 to provide a predetermined service to the client 105.

The communication state DB 133 stores communication states between the client 105 and the applications 1 to n (1321 to 132n) such as during starting of a communication, during implementing a communication, during ending of a communication or the like, while associating the applications 1 to n (1321 to 132n) with sessions. The communication state DB 133, for example, stores application identification information, session identification information and communication state information (FIG. 6). The application identification information, for example, contains application numbers to specify the applications 1 to n (1321 to 132n). The session identification information, for example, contains flow information that can be specified by IP 5 tuples (such as an IP source address, a destination address, a protocol number, a source port number and a destination port number) to specify communications between the client 105 and the applications 1 to n (1321 to 132n). The communication state information, for example, contains a communication state between the client 105 and the applications 1 to n (1321 to 132n) such as during establishing a session, during normal communication, during session ending or the like.

The communication state notification unit 134 performs a communication with the load distribution control server 101 or reads information from the communication state DB 133.

Note here that the flow state DB 112, the application communication state DB 114, the flow transfer DB 122 or the communication state DB 133 is made up of any storage device such as a magnetic disk device, an optical disk device or a memory. The flow state DB 112, the application communication state DB 114, the flow transfer DB 122 and the communication state DB 133 may be separated physically or be integrated physically. A plurality of clients 105 may concurrently connect with the plurality of application servers 1 to n (1031 to 103n) via the intermediate communication apparatus 102.

Figure 7:
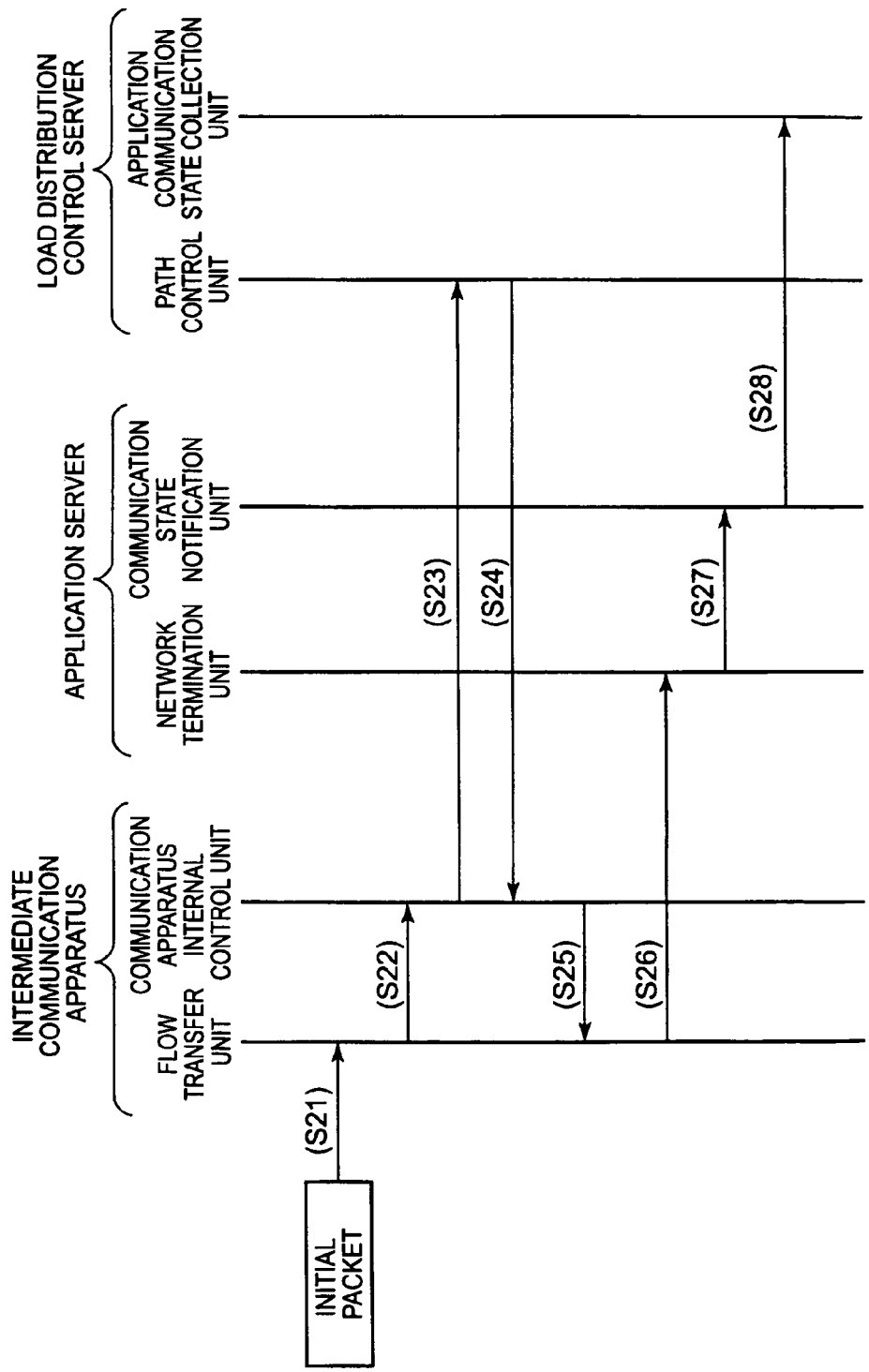
FIG. 7 is a flowchart illustrating an exemplary distributed processing flow by a distributed processing system according to one exemplary embodiment of the present invention.

The load distribution control server 101, the intermediate communication apparatus 102 and the application servers 1 to n (1031 to 103n) have a hardware configuration centered around a microcomputer including a CPU (Central Processing Unit) performing control processing, operation processing and the like, a ROM (Read Only Memory) storing control programs, operation programs and the like executed by the CPU, a RAM (Random Access Memory) temporarily storing processing data and the like. The following describes a distributed processing flow by the distributed processing system according to the present exemplary embodiment in detail. FIG. 7 is a flowchart illustrating an exemplary distributed processing flow by a distributed processing system according to the present exemplary embodiment.

For instance, upon receiving a packet of a flow that is not registered in the flow transfer DB 122 from the client 105, the flow transfer unit 121 of the intermediate communication apparatus 102 detects a mishit initial packet (Step S21). Then, the flow transfer unit 121 transmits this mishit packet to the communication apparatus internal control unit 123 (Step S22).

The communication apparatus internal control unit 123 transmits the transmitted mishit packet to the path control unit 111 of the load distribution control server 101 (Step S23). Thereby, the communication apparatus internal control unit 123 notifies the path control unit 111 about a new flow, i.e., the starting of a communication between a new client 105 and the applications 1 to n (1321 to 132n).

Upon receiving this notification about the new flow, the path control unit 111 decides a communication flow for this flow on the basis of topology information (connection form information) on a network including the intermediate communication apparatus 102 and the application servers 1 to n (1031 to 103n), load information on the application servers 1 to n (1031 to 103n) (information on the CPU, the memory, the number of applications on the application servers 1 to n (1031 to 103n), the number of communications and the like) and the like. The path control unit 111 further updates information of the application communication state DB 114 on the basis of the received packet.

Next, the path control unit 111 of the load distribution control server 101 extracts flow transfer information such as own-hop information (relay information) of the intermediate communication apparatus 102 from the decided communication path (Step S24). Then, the path control unit 111 returns the packet together with the flow transfer information for this flow to the communication apparatus internal control unit 123 of the intermediate communication apparatus 102.

Thereafter, the communication apparatus internal control unit 123 registers the flow transfer information with the flow transfer DB 122, while transmitting the packet from the path control unit 111 to the flow transfer unit 121 (Step S25).

Further, the flow transfer unit 121 transfers the packet transmitted from the communication apparatus internal control unit 123 to an application server 1 to n (1031 to 103n) in accordance with the flow transfer DB 122 (Step S26). The flow transfer unit 121 transfers a packet belonging to the corresponding flow received later in accordance with the flow transfer DB 122.

The network termination unit 131 of each application server 1 to n (1031 to 103n) performs termination processing of a received packet and transmits payload data to the applications 1 to n (1321 to 132n) (Step S27). The network termination unit 131 further updates a communication state so as to make the communication state agree with the actual state that the applications 1 to n (1321 to 132n) recognize, and transmits the updated communication state to the communication state notification unit 134.

The communication state notification unit 134 transmits the updated communication state to the application communication state collection unit 113 of the load distribution control server 101 (Step S28). The application communication state collection unit 113 makes the application communication state DB 114 store and manage the information on this communication state. In this way, the path control unit 111 of the load distribution control server 101 can maintain the consistency of a communication subjected to load distribution between the client 105 and the applications 1 to n (1321 to 132n).

The following is a detailed description on an operation flow of the communication ending processing between the client 105 and applications in the distributed processing system 100 according to the present exemplary embodiment. FIG. 8 illustrates an exemplary operation flow of the communication ending processing between the client and applications in the distributed processing system according to the present exemplary embodiment.

For instance, the flow transfer unit 121 of the intermediate communication apparatus 102 detects that transfer processing is not performed for a certain flow (Step S31). Herein, the flow transfer unit 121 performs such detection for the transfer processing not being performed when a communication state (FIG. 5) at the flow transfer DB 122 is not updated from the "no communication" to "communication performed" for a certain time period or longer. The communication apparatus internal control unit 123 acquires the flow information from the flow transfer DB 122. Then, the communication apparatus internal control unit 123 makes a confirmation that the acquired flow information is not in a communication state, and recognizes it as timeout.

Next, the communication apparatus internal control unit 123 of the intermediate communication apparatus 102 transmits a timeout flow to the path control unit 111 of the load distribution control server 101 (Step S32). Upon receiving the timeout flow, the path control unit 111 reads the flow information from the flow state DB 112 and acquires application information from the read flow information.

Thereafter, the path control unit 111 makes an inquiry about a communication state of an application to the application communication state collection unit 113 (Step S33). The application communication state collection unit 113 reads a communication state of the corresponding application from the application communication state DB 114 and acquires the same. When it is determined that the read communication state of the application is sufficiently new, the application communication state collection unit 113 proceeds to the following step (Step S36).

On the other hand, when it is determined that the information of the application communication state DB 114 is old, the application communication state collection unit 113 makes an inquiry about the communication state of the application to the communication state notification unit 134 of a specific application server 1 to n (1031 to 103n) where the application 1 to n (1321 to 132n) is operated (Step S34). The communication state notification unit 134 reads the communication state from the communication state DB 133 and acquires the same.

The communication state notification unit 134 transmits the acquired communication state of the application to the application communication state collection unit 113 of the load distribution control server 101 (Step S35). Then, the application communication state collection unit 113 updates the information of the application communication state DB 114 on the basis of the communication state of the application.

The application communication state collection unit 113 further transmits the acquired communication state of the application to the path control unit 111 (Step S36). When the application state is in an ending state or does not exist (completed), the path control unit 111 deletes the communication path information of the corresponding flow from the flow state DB 112.

The path control unit 111 further transmits the communication path information of the flow to the communication apparatus internal control unit 123 of the intermediate communication apparatus 102 (Step S37). When the communication state of the application acquired at (Step S36) is in an ending state or does not exist (completed), the path control unit 111 transmits communication path information indicating that the corresponding flow is to be deleted to the communication apparatus internal control unit 123. In other cases, the path control unit 111 transmits communication path information indicating that the flow is to be maintained. The communication apparatus internal control unit 123 changes the information of the flow transfer DB 122 in accordance with the transmitted communication path information.

As stated above, according to the distributed processing system 100 of the present exemplary embodiment, starting and timeout of a communication between the client 105 and the application servers 1 to n (1031 to 103n) can be detected appropriately, and a communication state of the application servers 1 to n (1031 to 103n) can be detected correctly. Further, using the intermediate communication apparatus 102 with a simple configuration that does not monitor a communication state flag in a flow packet, for example, the consistency of a communication in the distributed processing system 100 as a whole is maintained and managed. Thereby, abnormal connections or the like between the client 105 and the applications 1 to n (1321 to 132n) can be suppressed securely, and reliability of the distributed processing system 100 can be maintained appropriately. In other words, the cost for the distributed processing system 100 can be reduced, and reliability thereof can be maintained appropriately. Moreover, a communication connection between a new client 105 and an application 1 to n (1321 to 132n) is divided among the plurality of application servers 1 to n (1031 to 103n) appropriately, whereby a load on the application servers 1 to n (1031 to 103n) can be reduced, and scalability of the distributed processing system 100 as a whole can be improved.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2009-064338, filed on Mar. 17, 2009, the disclosure of which is incorporated herein in its entirety by reference.

REFERENCE SIGNS LIST 100 distributed processing system
101 load distribution control server
102 intermediate communication apparatus
1031 to 103n application servers 1 to n
1041 to 104n application communication state monitoring interfaces 1 to n
105 client
111 path control unit
112 flow state DB
113 application communication state collection unit
114 application communication state DB
121 flow transfer unit
122 flow transfer DB
123 communication apparatus internal control unit
131 network termination unit
1321 to 132n applications 1 to n
133 communication state DB
134 communication state notification unit

The invention claimed is:

1. A distributed processing system, comprising:
a plurality of application servers that execute a plurality of applications and detect a communication state between a client and the applications;
a load distribution control server that decides a communication path between the client and the applications on a basis of the communication state detected by the application servers to perform load distribution; and
an intermediate communication apparatus that receives, from the load distribution control server, information relating to the communication path decided by the load distribution control server, and transfers flow data between the client and the application servers based on the information sent from the load distribution control server, the communication state indicating session identification information including flow information of the flow data specified by IP 5 tuples,
wherein the load distribution control server does not exist on the communication path,
wherein the intermediate communication apparatus transfers flow data on the communication path decided by the load distribution control server,
wherein the intermediate communication apparatus detects timeout information indicating communication stop from the flow data, and the load distribution control server checks a communication state between the client and the applications in accordance with the timeout information from the intermediate communication apparatus to delete or maintain configured information on the communication path including an input port for inputting of a flow, an output port for outputting the flow, a destination MAC address, and an application server number, and
wherein each application server comprises:
the plurality of applications that provide a service to the client;
a communication state database that stores application identification information to specify the applications, the session identification information to specify a communication between the client and the applications, and communication state information between the client and the applications;
a communication state notification unit that transmits a communication state of the applications to the load distribution control server; and
a network termination unit that performs termination processing with respect to a communication between the client and the applications.

2. The distributed processing system according to claim 1, wherein the load distribution control server comprises:
an application communication state collection unit that collects a communication state of the applications from the application servers;
an application communication state database that stores the communication state of the applications collected by the application communication state collection unit;
a path control unit that specifies, on a basis of packet information on the flow data from the intermediate communication apparatus, the applications as a destination of the packet information and decides a communication path for flow control of the packet information; and
a flow state database that stores the session identification information including the flow information of the flow data and information on the communication path.

3. The distributed processing system according to claim 2, wherein the path control unit decides the communication path on a basis of topology information on a network including the intermediate communication apparatus and the application servers and load information on the application servers.

4. The distributed processing system according to claim 1, wherein the intermediate communication apparatus comprises:
a flow transfer database that stores the flow information on the flow data, transfer destination information on the flow data and communication state information on the flow data;
a flow transfer unit that transfers, on a basis of packet information on the flow data and the transfer destination information in the flow transfer database, the packet information; and
a communication apparatus internal control unit that performs a communication with the load distribution control server.

5. The distributed processing system according to claim 1, wherein the intermediate communication apparatus transfers the flow data between the client and the application servers outside a connection path between the intermediate communication apparatus with the load distribution control server.

6. The distributed processing system according to claim 1, wherein the load distribution control server is located outside a connecting path between the application servers and the client.

7. The distributed processing system according to claim 1, wherein the load distribution control server comprises a single server that decides the communication path between the client and an entirety of the applications.

8. The distributed processing system according to claim 1, wherein the load distribution control server deletes the configured information on the communication path when the communication state is in an ending state.

9. The distributed processing system according to claim 1, wherein the load distribution control server is configured to delete the configured information on the communication path.

10. A distributed processing method, comprising:
executing a plurality of applications and detecting a communication state between a client and the applications by application servers;
deciding a communication path between the client and the applications on a basis of the communication state detected and performing load distribution;
receiving, from a load distribution control server which decides the communication path, information relating to the communication path decided by the load distribution control server; and
transferring flow data between the client and the application servers, the communication state indicating session identification information including flow information of the flow data specified by IP 5 tuples,
wherein transferring flow data is performed on the decided communication path, wherein the load distribution is performed by a unit different from an apparatus which performs the transferring the flow data,
wherein timeout information indicating communication stop is detected from the flow data, and a communication state between the client and the applications is checked in accordance with the timeout information to delete or maintain configured information on the communication path including an input port for inputting of a flow, an output port for outputting the flow, a destination MAC address, and an application server number, and
storing application identification information to specify the applications, the session identification information to specify a communication between the client and the applications, and communication state information between the client and the applications;
transmitting a communication state of the applications to a load distribution control server; and
performing termination processing with respect to a communication between the client and the applications.

11. The distributed processing method according to claim 10, further comprising:
collecting a communication state of the applications;
storing the communication state of the applications collected;
specifying, on a basis of packet information on the flow data, the applications as a destination of the packet information and deciding a communication path for flow control of the packet information; and
storing the session identification information including the flow information on the flow data and information on the communication path.

12. The distributed processing method according to claim 10, wherein the communication path is decided on a basis of topology information on a network and the application servers and load information on the application servers.

13. The distributed processing method according to claim 10, further comprising:
storing the flow information on the flow data, transfer destination information on the flow data and communication state information on the flow data in a flow transfer database; and
transferring, on a basis of packet information of the flow data and the transfer destination information in the flow transfer database, the packet information.

14. The distributed processing method according to claim 10, wherein the unit that performs the load distribution transfers the flow data between the client and the application servers outside a connection path between the apparatus which performs the transferring flow data and the unit that performs the load distribution.

15. The distributed processing method according to claim 10, wherein the unit that performs the load distribution is located outside a connecting path between the application servers and the client.

16. The distributed processing method according to claim 10, wherein the unit that performs the load distribution comprises a single server that decides the communication path between the client and an entirety of the applications.

17. The distributed processing method according to claim 10, wherein the configured information on the communication path is deleted when the communication state is in an ending state.

18. The distributed processing method according to claim 10, further comprising:
deleting, by the load distribution control server, the configured information on the communication path.

* * * * *